United States Patent
Wong et al.

(10) Patent No.: US 6,959,179 B1
(45) Date of Patent: Oct. 25, 2005

(54) DOWN/UP-CONVERSION MIXER FOR DIRECT CONVERSION RADIOS

(75) Inventors: Hee Wong, San Jose, CA (US); Shu-Ing Ju, Palo Alto, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 377 days.

(21) Appl. No.: 10/068,293

(22) Filed: Feb. 6, 2002

(51) Int. Cl.$^7$ .................................................. H04B 1/26
(52) U.S. Cl. ...................................... 455/324; 455/334
(58) Field of Search .............................. 455/313, 318, 455/323, 334, 324, 202; 327/113, 117

(56) References Cited

U.S. PATENT DOCUMENTS

| | | | | |
|---|---|---|---|---|
| 3,922,593 A | * | 11/1975 | McGuffin et al. | 327/116 |
| 4,691,170 A | * | 9/1987 | Riley | 327/116 |
| 4,931,745 A | * | 6/1990 | Goff et al. | 330/9 |
| 5,303,417 A | * | 4/1994 | Laws | 455/314 |
| 5,486,788 A | * | 1/1996 | Schlager et al. | 330/9 |
| 6,125,272 A | * | 9/2000 | Bautista et al. | 455/326 |
| 2001/0016017 A1 | * | 8/2001 | Ishihara | 375/302 |
| 2002/0160740 A1 | * | 10/2002 | Hatcher et al. | 455/317 |
| 2003/0080809 A1 | * | 5/2003 | McGrath | 330/9 |

* cited by examiner

Primary Examiner—Sonny Trinh
Assistant Examiner—Sam Bhattacharya (57) ABSTRACT

A RF down/up-conversion circuit comprising: 1) a local oscillator chopping circuit comprising: a) a frequency divider circuit for receiving a first local oscillator (LO) signal having a frequency of LO and generating a frequency-divided second local oscillator (LO) signal having a frequency of LO/N and synchronized with the first LO signal; and b) a multiplier for receiving the first and second LO signals and generating a product signal of the first and second LO signals; and 2) a differential radio frequency (RF) mixer having a first differential input port for receiving the product signal from the multiplier and a second differential input port for receiving a first differential modulated radio frequency (RF) signal and a second differential modulated radio frequency (RF) signal, wherein the differential RF mixer generates a differential output signal.

20 Claims, 4 Drawing Sheets

DOWN/UP-CONVERSION MIXER FOR DIRECT CONVERSION RADIOS

TECHNICAL FIELD OF THE INVENTION

The present invention is generally directed to radio frequency (RF) receivers and, in particular, to a down/up-conversion mixer utilizing a chopping switch to reduce DC-offset and low frequency noise from the RF mixer and amplifiers.

BACKGROUND OF THE INVENTION

Business and consumers use a wide array of wireless devices, including cell phones, wireless local area network (LAN) cards, global positioning system (GPS) devices, electronic organizers equipped with wireless modems, and the like. The increased demand for wireless communication devices has created a corresponding demand for technical improvements to such devices. Generally speaking, more and more of the components of conventional radio receivers and transmitters are being fabricated in a single integrated circuit (IC) package. In order to simplify single chip designs and to make each design suitable for as many applications as possible, much emphasis has been placed on developing direct conversion receivers and software-defined radios.

In a direct-conversion radio, the information demodulation requires a down-conversion mixer to recover the transmitted baseband signal. The output of a down-conversion mixer is given by the equation:

$$\cos(RF)^*\cos(LO)=0.5[\cos(RF-LO)+\cos(RF+LO)] \quad \text{(EQN. 1)}$$

where cos(RF) is the signal received through the antenna and cos(LO) is the reference clock signal from a local oscillator. The RF signal can be expanded to show components of modulation (i.e., $RF=(\omega_{carrier}+\omega_{modulation})$ t for a frequency modulated signal. Also the frequency of cos(LO) is close to or identical to the center frequency of RF (or $\omega_{carrier}$). A square wave clock is an implementation option.

Multiplying the cos(RF) and cos(LO) signal produces two output signals: cos (RF−LO) and cos(RF+LO). The cos (RF−LO) signal is the recovered transmitted baseband signal (or $\omega_{modulation}$). The cos(RF+LO) signal is a by-product not contributing to the recovered baseband signal and should be removed by low-pass filters in the baseband filter block.

Figure 2:
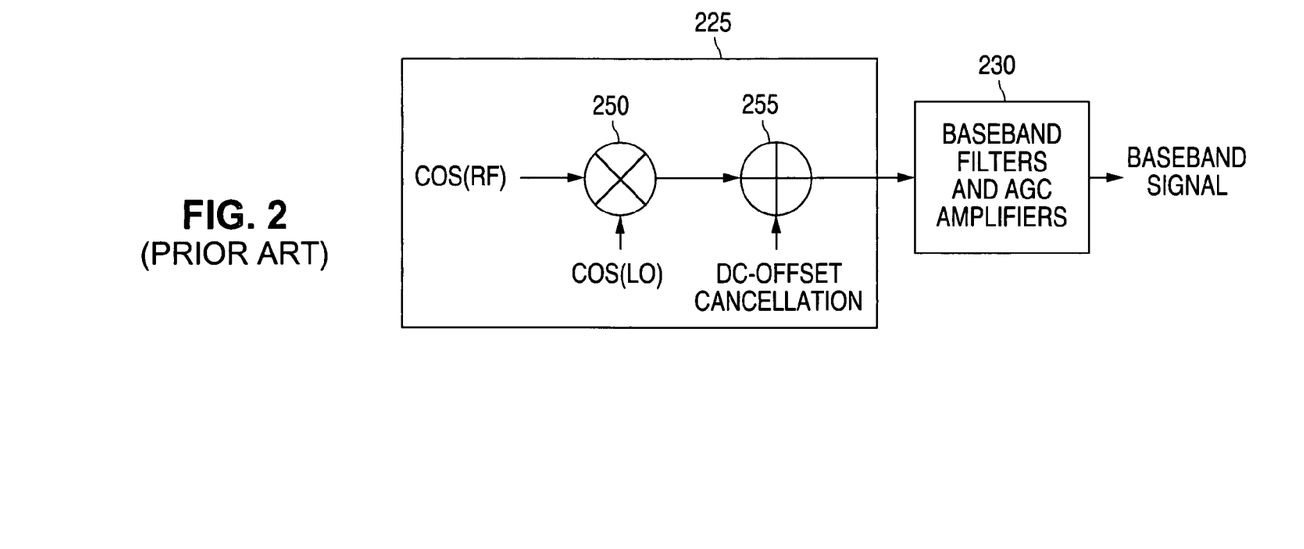
FIG. 2 illustrates selected portions of a conventional downconversion mixer according to an exemplary embodiment of the prior art.

FIG. 2 illustrates conventional radio frequency (RF) mixing stage 225 containing down-conversion mixer 250 according to an exemplary embodiment of the prior art. Down-conversion mixer 250 receives an input RF signal, cos(RF), from the receiver front-end amplifiers and a local oscillator reference signal, cos(LO), from a local oscillator and outputs a baseband signal to DC cancellation block 255. Down-conversion mixer 250, due to mismatches in its internal signal paths, develops a DC-offset at its output. DC-offset cancellation block 255 is required to remove the offset before connecting the mixer output to the baseband filters and automatic gain control (AGC) amplifier block 230. The baseband filters comprise cascading lowpass filters which provide a channel selectivity function. The AGC amplifiers provide programmable gain stages to condition the demodulated signal level.

When building high sensitivity direct-conversion radios (i.e., <−100 dBm) with good blocking characteristics, this architecture is impractical because the demodulated signal level at the mixer output is relatively small in comparison to the magnitude of the DC-offset and low frequency noise generated from these blocks.

Therefore, there is a need in the art for improved RF receivers that are low cost, high performance and easily integrated into a single integrated circuit chip. In particular, there is a need for an improved high sensitivity direct-conversion radios that do not require DC-offset cancellation circuits and complex baseband filters to remove noise.

SUMMARY OF THE INVENTION

The present invention provides a down/up-conversion mixing scheme to solve these offset/noise problems. In addition to the basic down-conversion function for demodulation, the present invention includes an integral up-conversion function for re-modulating the demodulated signals to high frequencies. These high frequency signals feed the downstream blocks for further signal filtering and amplification. Since the processing frequencies are not in baseband, the DC-offset signal and noise signal from the RF mixer and the filter and amplifier blocks are no longer the performance limiting factors.

To address the above-discussed deficiencies of the prior art, it is a primary object of the present invention to provide a radio frequency (RF) down/up-conversion circuit. According to an advantageous embodiment of the present invention, the RF down/up-conversion circuit comprises: 1) a local oscillator chopping circuit comprising: a) a frequency divider circuit capable of receiving a first local oscillator (LO) signal having a frequency of LO and generating therefrom a frequency-divided second local oscillator (LO) signal having a frequency of LO/N and synchronized with the first LO signal; and b) a multiplier capable of receiving the first and second LO signals and generating a product signal of the first and second LO signals; and 2) a differential radio frequency (RF) mixer having a first differential input port capable of receiving the product signal from the multiplier and a second differential input port capable of receiving a first differential modulated radio frequency (RF) signal and a second differential modulated radio frequency (RF) signal, wherein the differential RF mixer generates a differential output signal.

According to one embodiment of the present invention, the multiplier is an analog multiplier.

According to another embodiment of the present invention, the multiplier is an exclusive-OR gate.

According to still another embodiment of the present invention, the differential output signal of the differential RF mixer is a double-sideband suppressed carrier signal.

According to yet another embodiment of the present invention, the radio frequency down/up-conversion circuit further comprises a chopping switch capable of receiving the differential output signal of the differential RF mixer.

According to a further embodiment of the present invention, the chopping switch is synchronized to the frequency divider such that the chopping switch switches its internal connections at the LO/N frequency of the frequency divider and in tandem with the frequency divider.

According to a still further embodiment of the present invention, the differential RF mixer comprises a first differential pair of transistors comprising a first transistor and a second transistor, wherein a base of the first transistor is coupled to a first differential output signal received from the multiplier, and an emitter of the first transistor is coupled to an emitter of the second transistor and to the first differential modulated radio frequency (RF) signal.

According to a yet further embodiment of the present invention, the differential RF mixer comprises a second differential pair of transistors comprising a third transistor and a fourth transistor, wherein a base of the third transistor is coupled to a second differential output signal received from the multiplier, and an emitter of the third transistor is coupled to an emitter of the fourth transistor and to the second differential modulated radio frequency (RF) signal.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged radio frequency (RF) receiver.

Figure 1:
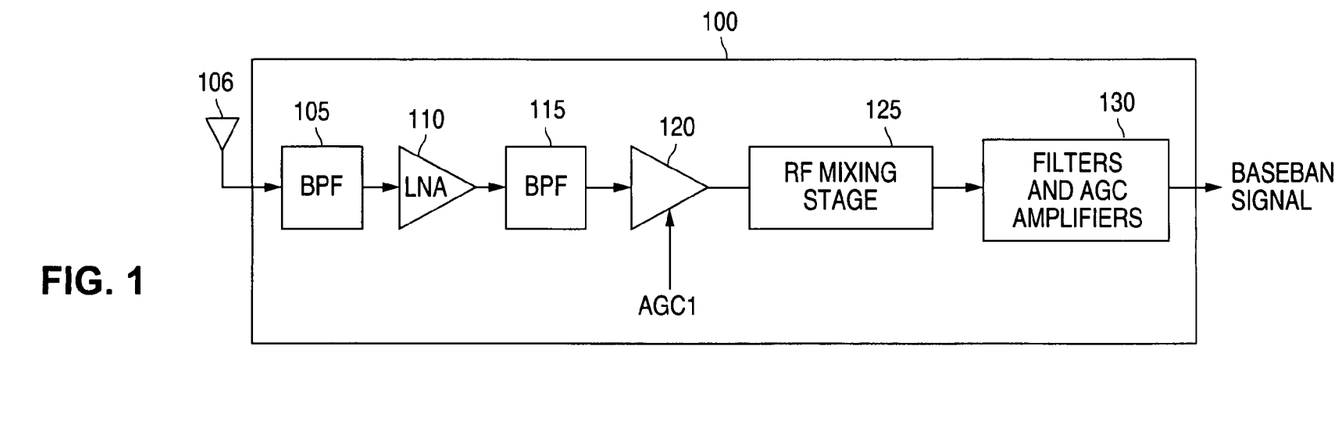
FIG. 1 illustrates selected portions of the receive signal path of an exemplary RF transceiver according to one embodiment of the present invention.

FIG. 1 illustrates selected portions of the receive signal path of exemplary RF receiver 100 according to one embodiment of the present invention. RF receiver 100 may be implemented in any conventional one-way or two-way RF communication device, including a cell phone, a wireless network card, a two-way pager, and the like. For the purpose of simplifying the explanation of the present invention, the transmitter portion of a two-way communication embodiment of the present invention is not shown.

The RF receive path through RF receiver 100 comprises band pass filter (BPF) 105, which receives an incoming RF signal from antenna 106. The RF receive path further comprises low-noise amplifier (LNA) 110, band pass filter (BPF) 115, RF amplifier 120, RF mixing stage 125, and filters and AGC amplifiers block 130.

BPF 105 isolates the frequencies of interest in the incoming RF signal from antenna 106 and filters out unwanted frequency bands. LNA 110 amplifies the filtered output of BPF 105 to an intermediate level. BPF 115 further filters the amplified output of LNA 110 to remove noise outside of the desired receiver frequency range that were amplified by, or introduced by, LNA 110. RF amplifier 120 further amplifies the output of BPF 115 by a variable amount of gain determined by the gain control signal AGC1. RF mixing stage 125 down-converts the output of RF amplifier 120 by mixing it with a local oscillator reference signal. RF mixing stage 125 effectively shifts the information signal centered around the receiver RF operating frequency down to a baseband signal. Filters and AGC amplifiers block 130 comprises additional filtering circuitry and automatic gain control circuitry that further improve the quality of the baseband signal from RF mixing stage 125.

Those skilled in the art will recognize that, in alternate embodiments of the present invention, one or more of BPF 105 and BPF 115 may be other types of filters, including low pass filters. The choice of bandpass filters in the exemplary embodiment described above is by way illustration only and should not be construed so as to limit the scope of the present invention.

Figure 3A:
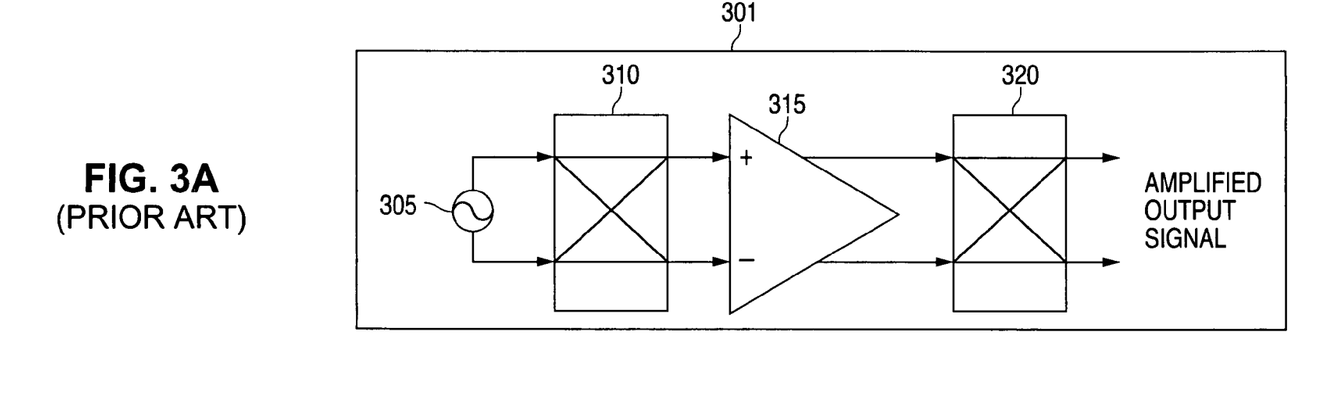
FIG. 3A illustrates a conventional chopper amplifier according to an exemplary embodiment of the prior art.

The present invention uses the principles of a conventional chopping amplifier in RF mixing stage 125 to provide a basic down-conversion function for demodulation and an integral up-conversion function for re-modulating the demodulated signals to high frequencies. FIG. 3A illustrates conventional chopper amplifier 301 according to an exemplary embodiment of the prior art. Chopper amplifier 301 comprises input chopping switch 310, amplifier 315, and output chopping switch 320. Low frequency signal source 305 generates a low frequency signal that is applied to the two inputs of input chopping switch 310.

Input chopping switch 310 chops up the input signal by continuously switching its internal connection paths between its two input terminals and its two output terminals. In a first position, a first input of input chopping switch 310 is connected to the non-inverting (+) input of amplifier 315 and the second input of input chopping switch 310 is connected to the inverting input (−) of amplifier 315. In a second position, the first input of input chopping switch 310 is connected to the inverting (−) input of amplifier 315 and the second input of input chopping switch 310 is connected to the non-inverting input (+) of amplifier 315. Input chopping switch 310 switches between the first and second positions at a known clock speed.

Output chopping switch 320 is driven by the same clock as input chopping switch 310 and switched positions in tandem with input chopping switch 315 (or with a slight delay to compensate for the delay of amplifier 315. In a first position, a first input of output chopping switch 320 is connected to the non-inverting output of amplifier 315 and the second input of output chopping switch 320 is connected to the inverting output of amplifier 315. In a second position, the first input of output chopping switch 320 is connected to the inverting output of amplifier 315 and the second input of output chopping switch 320 is connected to the non-inverting output of amplifier 315.

Since output chopping switch 320 switches in tandem with input chopping switch 310, output chopping switch 320 undoes the polarity reversing performed by input chopping switch 310. Thus, the output of output chopping switch 320 is simply an amplified version of the input signal generated by low frequency signal source 305. However, chopping switches 310 and 320 switch at a much higher rate than low frequency signal source 305. Because of the continual switching of the input signal, any DC-offset that might normally develop in amplifier 315 is negated, so that there is zero DC-offset at the output of amplifier 315.

In effect, input chopping switch 310 is an up-conversion modulator and output chopping switch 320 is a down-conversion demodulator. The signal after up-conversion is a double-sideband signal whose center frequency is at the chopping frequency. The signal after down-conversion is an amplified version of the input baseband signal. Thus, the operating frequencies of amplifier 315 are not in the low frequency band and the intrinsic offset and low frequency noise of amplifier 315 are no longer the performance limiting factors.

Figure 3B:
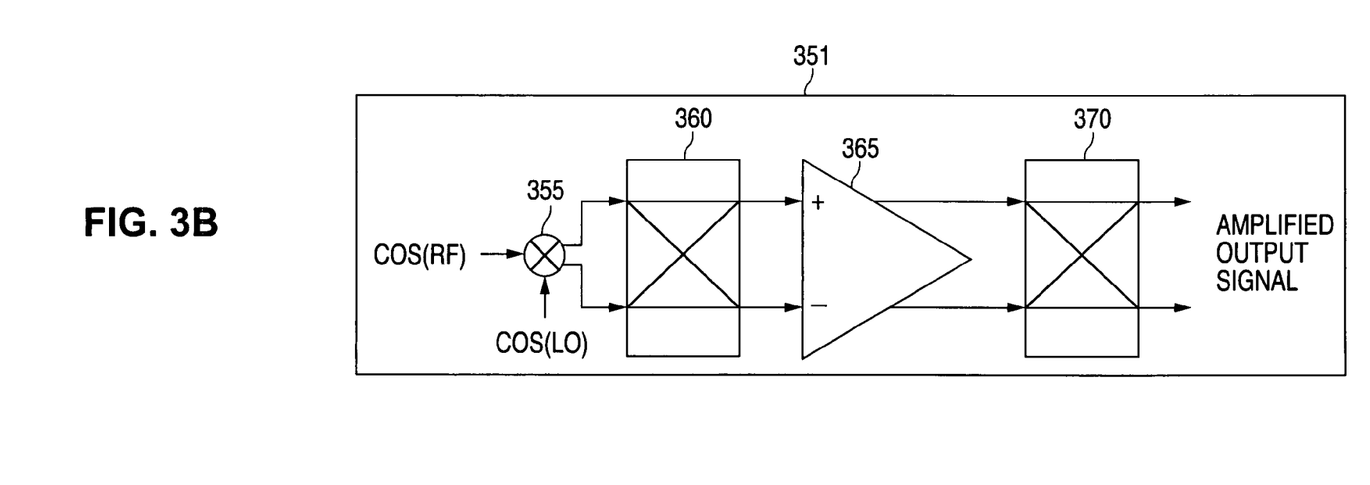
FIG. 3B illustrates a simple direct conversion radio receiver that utilizes chopping switches according to an exemplary embodiment of the present invention.

FIG. 3B illustrates simple direct conversion radio receiver 351, which utilizes chopping switches according to an exemplary embodiment of the present invention. Direct conversion radio receiver 351 comprises RF mixer 355, input chopping switch 360, amplifier 365, and output chopping switch 370. The only difference between direct conversion radio receiver 351 and chopping amplifier 301 in FIG. 3A is that low-frequency signal source 305 has been replaced with RF mixer 355. RF mixer 355 receives the cos(RF) signal from the antenna and receiver front-end and receives the cos(LO) signal from a local oscillator. RF mixer 355 produces a differential baseband signal that is fed into a chopping amplifier.

This simple direct conversion radio, however, has no provision to cancel out the intrinsic offset and noise of RF mixer 355. The reason is simply that the mixer is placed outside the chopper circuitry. In order to achieve a full canceling effect, the mixer must be placed within the input and output chopping switches. The present invention provides mixer circuitry that includes an integral chopping function before the mixer output terminals. In other words, the mixer provides down-conversion and up-conversion simultaneously. The down-conversion function is the original mixer function (to recover the transmitted baseband information), while the integral up-conversion function is equivalent to the function provided by the input chopping switch.

Figure 4:
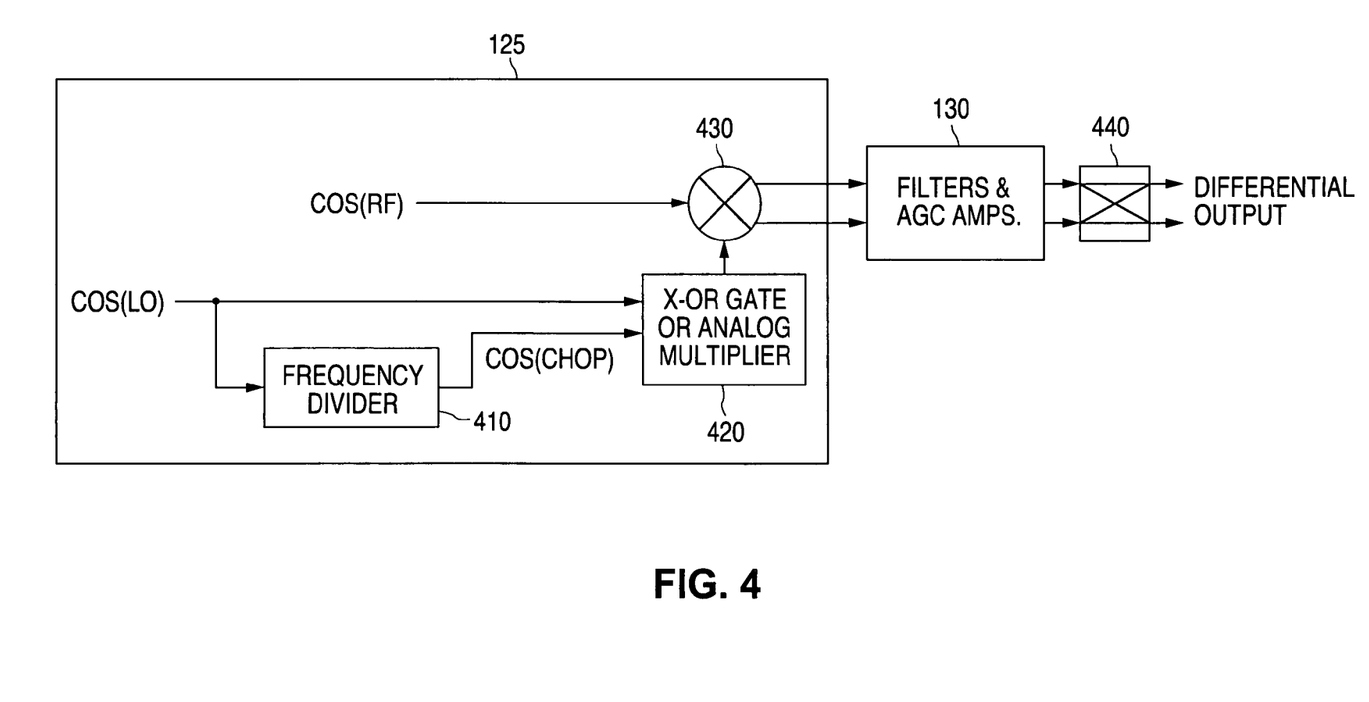
FIG. 4 illustrates an exemplary down-upconversion mixer according to one embodiment of the present invention.

FIG. 4 illustrates selected portions of RF mixing stage 125 in which a down/up-conversion mixer according to the principles of the present invention is implemented. RF mixing stage 125 comprises frequency divider 410, exclusive-OR (X-OR) gate (or analog multiplier) 420, RF mixer 430, filters and AGC amplifiers block 130, and output chopping switch 440. Frequency divider 410 and X-OR gate 420 are inserted into the cos(LO) path of a conventional mixer circuit. This additional circuitry continually reverses the signal polarity of cos(LO) before driving the input of RF mixer 430. The reversing rate of cos(CHOP) is determined by a divisor (N) of frequency divider 410 and is several times lower than the frequency of cos(LO). However, the reversing rate of cos(CHOP) is still much higher than the frequency of the demodulated baseband signal, cos(RF−LO).

In effect, the modulated cos(LO) down-converts as well as up-converts cos(RF) to a double-sideband suppressed carrier signal at the mixer outputs. This signal type matches the input requirement of the downstream chopper filter/amplifier block. Conventional output chopping switch 440 may be utilized after filters and AGC amplifiers block 130 to recover the transmitted baseband signal. The filters are DSB-IF filters.

Mathematically, the output of the down-conversion mixer is given by the equation:

$$\cos(RF)*\cos(LO)*\cos(Chop) = 0.25[\cos(ChopB(RF-LO))+\cos(ChopB(RF+LO)+\cos(Chop+(RF-LO))+\cos(Chop+(RF+LO)]$$

where cos(RF) is the signal received from the transmitter through the antenna, cos(LO) is the clock from a local oscillator, with LO=RF when there is no modulation, and cos(Chop) is the chopping frequency.

Multiplying these signals together produces four output signals:
1) cos(Chop-(RF−LO));
2) cos(Chop+(RF−LO));
3) cos(ChopB(RF+LO)); and
4) cos(Chop+(RF+LO)).

The cos(Chop-(RF−LO)) and cos(Chop+(RF−LO))0 signals are the lower and upper sidebands of the chopped baseband signal. The cos(ChopB(RF+LO)) and cos(Chop+(RF+LO)) signals are by-product terms not contributing to the chopped baseband signal that should be removed by low-pass filters in the baseband filter block.

Figure 5:
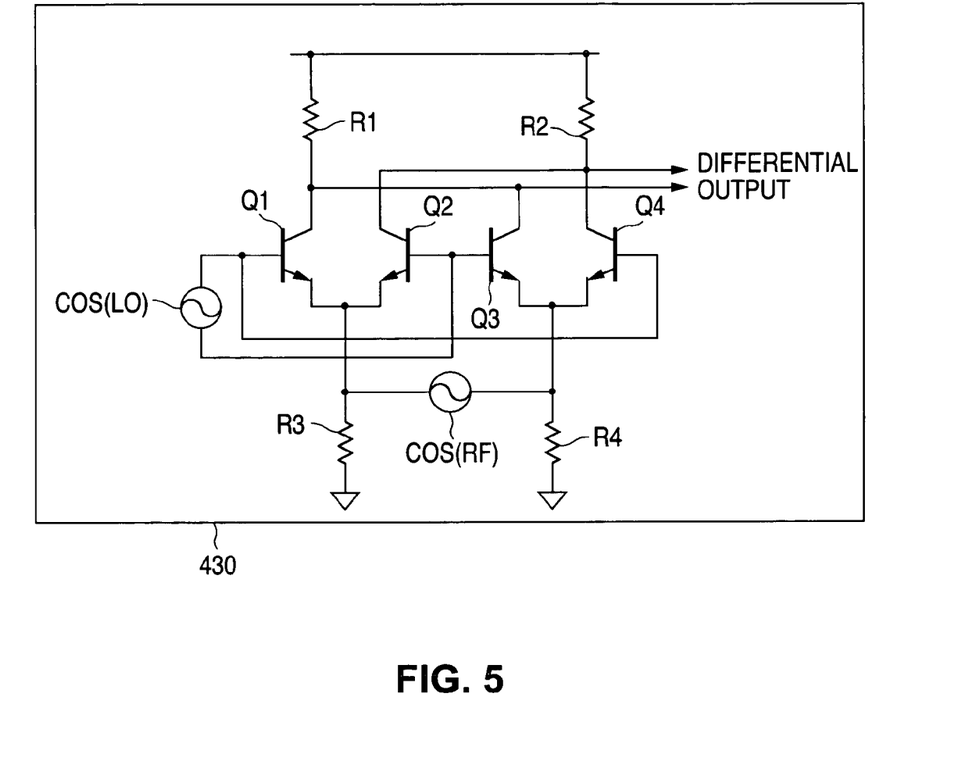
FIG. 5 illustrates a simple mixer circuit suitable for use in a down-upconversion mixer according to the principles of the present invention.

FIG. 5 illustrates simple RF mixer 430, which is one embodiment of a down/up-conversion mixer according to the principles of the present invention. RF mixer 430 comprises NPN bias junction transistors (BJT) Q1, Q2, Q3, and Q4 and resistors R1, R2, R3, and R4. Transistors Q1 and Q2 form a first differential pair that receive the chopped cos(LO) signal from the output of analog multiplier 420. The emitters of transistors Q1 and Q2 are coupled directly to each other and to ground via resistor R3. Transistors Q3 and Q4 form a second differential pair that receive the chopped cos(LO) signal from the output of analog multiplier 420. The bases of transistors Q1 and Q4 are connected to the same differential output of analog multiplier 420. The bases of transistors Q2 and Q3 are connected to the other differential output of analog multiplier 420.

Resistor R1 is a load resistor that couples the collectors of transistors Q1 and Q3 to the positive power supply rail. Resistor R2 is a load resistor that couples the collectors of transistors Q2 and Q4 to the positive power supply rail. The emitters of transistors Q3 and Q4 are coupled to ground via resistor R4. The emitters of transistors Q1 and Q2 are coupled to ground via resistor R3. The cos(RF) input is coupled between the junction of the emitters of transistors Q1 and Q2 and the junction of the emitters of transistors Q3 and Q4.

Although the present invention has been described in detail, those skilled in the art should understand that they can make various changes, substitutions and alterations herein without departing from the spirit and scope of the invention in its broadest form.

What is claimed is:

1. A radio frequency (RF) down/up-conversion circuit comprising:
   a local oscillator chopping circuit comprising:
   a frequency divider circuit capable of receiving a first local oscillator (LO) signal having a frequency of LO and generating therefrom a frequency-divided second local oscillator (LO) signal having a frequency of LO/N and synchronized with said first LO signal; and
   a multiplier capable of receiving said first and second LO signals and generating a signal that during selected periods of time has a signal polarity that is reversed relative to a signal polarity of said first LO signal; and
   a differential radio frequency (RF) mixer having a first differential input port capable of receiving said signal from said multiplier and a second differential input port capable of receiving a first differential modulated radio frequency (RF) signal and a second differential modulated radio frequency (RF) signal, wherein said differential RF mixer generates a differential output signal.

2. The radio frequency down/up-conversion circuit as set forth in claim 1 wherein said multiplier is an analog multiplier.

3. The radio frequency down/up-conversion circuit as set forth in claim 1 wherein said multiplier is an exclusive-OR gate.

4. The radio frequency down/up-conversion circuit as set forth in claim 1 wherein said differential output signal of said differential RF mixer is a double-sideband suppressed carrier signal.

5. The radio frequency down/up-conversion circuit as set forth in claim 4 further comprising a chopping switch capable of receiving said differential output signal of said differential RF mixer.

6. The radio frequency down/up-conversion circuit as set forth in claim 5 wherein said chopping switch is synchronized to said frequency divider such that said switching switch switches its internal connections at said LO/N frequency of said frequency divider and in tandem with said frequency divider.

7. The radio frequency down/up-conversion circuit as set forth in claim 1 wherein said differential RF mixer comprises a first differential pair of transistors comprising a first transistor and a second transistor, wherein a base of said first transistor is coupled to a first differential output signal received from said multiplier, and an emitter of said first transistor is coupled to an emitter of said second transistor and to said first differential modulated radio frequency (RF) signal.

8. The radio frequency down/up-conversion circuit as set forth in claim 7 wherein said differential RF mixer comprises a second differential pair of transistors comprising a third transistor and a fourth transistor, wherein a base of said third transistor is coupled to a second differential output signal received from said multiplier, and an emitter of said third transistor is coupled to an emitter of said fourth transistor and to said second differential modulated radio frequency (RF) signal.

9. The radio frequency down/up-conversion circuit as set forth in claim 8 wherein a collector of said first transistor is coupled to a collector of said third transistor to form a first differential output signal of said differential output signal generated by said RF mixer and wherein a collector of said second transistor is coupled to a collector of said fourth transistor to form a second differential output signal of said differential output signal generated by said RF mixer.

10. A radio frequency (RF) receiver comprising:
    a receiver front-end circuit capable of receiving an incoming RF signal from an antenna and filtering and amplifying said incoming RF signal; and
    a radio frequency (RF) down/up-conversion circuit coupled to said receiver front-end circuit comprising:
    a local oscillator chopping circuit comprising:
    a frequency divider circuit capable of receiving a first local oscillator (LO) signal having a frequency of LO and generating therefrom a frequency-divided second local oscillator (LO) signal having a frequency of LO/N and synchronized with said first LO signal; and
    a multiplier capable of receiving said first and second LO signals and generating a signal that during selected periods of time has a signal polarity that is reversed relative to a signal polarity of said first LO signal; and
    a differential radio frequency (RF) mixer having a first differential input port capable of receiving said signal from said multiplier and a second differential input port capable of receiving a first differential modulated radio frequency (RF) signal and a second differential modulated radio frequency (RF) signal, wherein said differential RF mixer generates a differential output signal.

11. The radio frequency receiver as set forth in claim 10 wherein said multiplier is an analog multiplier.

12. The radio frequency receiver as set forth in claim 10 wherein said multiplier is an exclusive-OR gate.

13. The radio frequency receiver as set forth in claim 10 wherein said differential output signal of said differential RF mixer is a double-sideband suppressed carrier signal.

14. The radio frequency receiver as set forth in claim 13 further comprising a chopping switch capable of receiving said differential output signal of said differential RF mixer.

15. The radio frequency receiver as set forth in claim 14 wherein said chopping switch is synchronized to said frequency divider such that said switching switch switches its internal connections at said LO/N frequency of said frequency divider and in tandem with said frequency divider.

16. The radio frequency receiver as set forth in claim 10 wherein said differential RF mixer comprises a first differential pair of transistors comprising a first transistor and a second transistor, wherein a base of said first transistor is coupled to a first differential output signal received from said multiplier, and an emitter of said first transistor is coupled to an emitter of said second transistor and to said first differential modulated radio frequency (RF) signal.

17. The radio frequency receiver as set forth in claim 16 wherein said differential RF mixer comprises a second differential pair of transistors comprising a third transistor and a fourth transistor, wherein a base of said third transistor is coupled to a second differential output signal received from said multiplier, and an emitter of said third transistor is coupled to an emitter of said fourth transistor and to said second differential modulated radio frequency (RF) signal.

18. The radio frequency receiver as set forth in claim 17 wherein a collector of said first transistor is coupled to a collector of said third transistor to form a first differential output signal of said differential output signal generated by said RF mixer and wherein a collector of said second transistor is coupled to a collector of said fourth transistor to form a second differential output signal of said differential output signal generated by said RF mixer.

19. A method of demodulating an incoming differential radio frequency (RF) signal having a frequency of RF comprising the steps of:

receiving a first local oscillator (LO) signal having a frequency of LO;

generating therefrom a frequency-divided second local oscillator (LO) signal having a frequency of LO/N and synchronized with the first LO signal;

multiplying the first and second LO signals and generating a product signal of the first and second LO signals that during selected periods of time has a signal polarity that is reversed relative to a signal polarity of said first LO signal; and mixing the product signal from the multiplier and the differential radio frequency signal and generating a differential output signal.

20. The method as set forth in claim 19 wherein the differential output signal is a double-sideband suppressed carrier signal.

* * * * *

UNITED STATES PATENT AND TRADEMARK OFFICE
CERTIFICATE OF CORRECTION

PATENT NO. : 6,959,179 B1 Page 1 of 1
APPLICATION NO. : 10/068293
DATED : October 25, 2005
INVENTOR(S) : Hee Wong and Shu-Ing Ju It is certified that error appears in the above-identified patent and that said Letters Patent is hereby corrected as shown below:

Please delete Fig. 4 and substitute with the following Fig. 4 as attached.

FIG. 4

Signed and Sealed this

Twenty-fourth Day of October, 2006

JON W. DUDAS
*Director of the United States Patent and Trademark Office*